United States Patent [19]

Rainer et al.

[11] 4,246,910

[45] Jan. 27, 1981

[54] CIGARETTE FILTER MATERIAL COMPRISING COMPOUNDS OF IRON IN HIGH OXIDATION STATES

[75] Inventors: Norman B. Rainer; Cynthia V. Bailey, both of Richmond, Va.

[73] Assignee: Philip Morris Incorporated, New York, N.Y.

[21] Appl. No.: 820,502

[22] Filed: Aug. 1, 1977

[51] Int. Cl.$^3$ .................. A24D 3/16; B01D 53/04; B01D 59/28; C01C 3/12
[52] U.S. Cl. .................. 131/10.9; 423/236; 423/245; 423/367; 55/387; 55/389
[58] Field of Search .................. 23/284; 131/9, 10 R, 131/10.7, 10.9, 17 R, 15 R, 264–267; 423/236, 245, 367; 252/186

[56] References Cited

U.S. PATENT DOCUMENTS

| | | | |
|---|---|---|---|
| 2,758,090 | 8/1956 | Mills et al. | 252/186 |
| 2,792,841 | 5/1957 | Carson | 131/10 R |
| 3,355,317 | 11/1967 | Keith et al. | 131/10.9 |
| 3,434,479 | 3/1969 | Till et al. | 131/265 |
| 3,658,069 | 4/1972 | Wise | 131/265 |
| 3,669,126 | 6/1972 | Soussa et al. | 131/265 |
| 3,889,691 | 6/1975 | Urbanic | 131/10.9 |

FOREIGN PATENT DOCUMENTS

| | | | |
|---|---|---|---|
| 49-37894 | 4/1974 | Japan | 131/10.9 |
| 6503794 | 3/1965 | Netherlands . | |
| 741271 | 8/1950 | United Kingdom . | |
| 958470 | 5/1964 | United Kingdom . | |

OTHER PUBLICATIONS

*Hydrocarbon Processing* vol. 54, p. 93 "Nonox process removes H$_2$S" by Kasai.

*Primary Examiner*—V. Millin
*Attorney, Agent, or Firm*—Susan A. Hutcheson; Arthur I. Palmer, Jr.; George E. Inskeep

[57] ABSTRACT

Inert gas-permeable granular support materials impregnated with alkali ferrates wherein the ferrates are iron compounds having an oxidation state of +4, +5, or +6 are disclosed. When they are used as a granular filter material in combination with a tobacco product, hydrogen cyanide can be significantly reduced in the smoke obtained from the tobacco product. Activated carbon or alumina impregnated with sodium permanganate and a basic sodium compound may also be combined with the granular filter material.

9 Claims, No Drawings

CIGARETTE FILTER MATERIAL COMPRISING COMPOUNDS OF IRON IN HIGH OXIDATION STATES

BACKGROUND OF THE INVENTION

This invention concerns improvements related to filtration. More particularly, in a preferred embodiment, this invention relates to improved filters for cigarettes, cigars or other smoking articles which are effective in the removal of certain smoke phase components such as hydrogen cyanide and ammonia.

Methods for selective removal of hydrogen cyanide from cigarette smoke by means of special filter compositions have been proposed. For example, U.S. Pat. No. 3,664,352, discloses alkaline additives such as alkali metal carbonates which may be applied to conventional filter materials to remove any hydrogen cyanide contained in tobacco smoke. Activated carbonaceous material with a surface treatment of copper oxide has also been proposed for hydrogen cyanide removal. U.S. Pat. Nos. 3,251,365, 3,460,543, and 3,355,317 disclose various metal oxides, namely oxides of cobalt, copper, zinc or iron, on a carrier for removal of hydrogen cyanide. U.S. Pat. No. 3,550,600 discloses zinc acetate in admixture with an organic or inorganic base on a smoke filter paper or cellulose acetate filter support which is described as being effective in the removal of various gaseous components, including hydrogen cyanide, from tobacco smoke.

U.S. Pat. No. 3,828,800 discloses certain anion exchange resins which have an affinity for volatile aldehydes as well as the capability to filter other components such as hydrogen cyanide. U.S. Pat. No. 28,858 discloses buffered polyalkyleneimines which exhibit an affinity for smoke acids.

U.S. Pat. Nos. 3,946,101, 3,875,949, and 3,842,070 disclose a complex fluid filter comprising cellulose which has been oxidized by an inorganic metal nitrate. The filter is described as being useful in removing gaseous and particulate components of smoke.

U.S. Pat. No. 3,618,619 discloses filters fabricated from cellulose acetate which has been impregnated with metal oxides of zinc, iron, copper, etc. and are effective in removing hydrogen cyanide.

U.S. Pat. No. 3,417,758 discloses filters containing a water-soluble, weak basic inorganic salt, i.e., sodium or potassium phosphite, which are described as effective in neutralizing hydrogen cyanide in tobacco smoke.

U.S. Pat. No. 4,022,223 discloses salts of copper and nickel complexed with selected aliphatic or aromatic amines which effectively remove hydrogen cyanide from tobacco smoke.

Although many of the aforementioned additives are effective in reducing hydrogen cyanide in smoke, certain disadvantages remain from a smoker's viewpoint. In some instances, volatile flavorants are removed, thus altering the desirable subjective characteristics. In addition, some of the additives may give an off-taste which renders them undesirable for smoking articles. Other of the methods or additives discussed hereinabove are not suitable due to the unstable nature of the compounds used or to the expense in preparing them.

It is, therefore, an object of the present invention to provide a tobacco smoke filter material capable of removing cyanides, and particularly hydrogen cyanide, from tobacco smoke.

A further object of the present invention is to provide a smoking article in combination with a filter material capable of removing hydrogen cyanide from tobacco smoke.

These and still other objects will be discussed more fully in the description of the invention which follows.

SUMMARY OF THE INVENTION

The above and other beneficial objects and advantages are obtained in accordance with the present invention by an improved smoke filter material which comprises a chemically inert, porous, granular support material impregnated with an additive having an affinity for gas phase components and more particularly for hydrogen cyanide. The filter additives of the present invention are certain iron compounds in higher oxidation states of +4, +5, and +6 associated with oxygen in an anion radical. Such compounds are known in the literature and are generally referred to as ferrate (IV), ferrate (V), and ferrate (VI). The preferred compounds of the invention are the alkali and alkaline earth salts of ferrate (VI). The most preferred individual compound is potassium ferrate ($K_2FeO_4$).

The ferrate compounds of the present invention have been investigated previously for use in water purification systems and specifically for the oxidation of ammonia in water. (See *Oxidation of Ammonia in Water by Ferrates* (VI) and (IV), Suanks, Karlis. Project Completion Report No. 444, Water Resources Center, Ohio State University, Columbus, Ohio.) In addition, alkaline ferrate (VI) in combination with a ferrite solution has been used for removing hydrogen sulfide from a low-pressure gas by absorption. The hydrogen sulfide present in the gas is oxidized to sulfur and may be recovered. (See Japan Kokai No. 74:37,894.) The use of ferrates in filter elements for the removal of gas phase components of tobacco smoke, and specifically, hydrogen cyanide has not been proposed heretofore.

DETAILED DESCRIPTION OF THE INVENTION

Suitable substrate materials which may be employed include granular substances which are substantially inert to the alkaline ferrates.

Granular substances which may be employed in forming a gas-permeable bed may consist of (a) inorganic substances such as silica gel, activated alumina, magnesia, calcium sulfate, diatomaceous earth, perlite, and still other inorganic substances; (b) organic substances such as polyethylene, polystyrene, and still other organic substances; and (c) molecular sieve materials such as zeolites. The granular substance is preferably porous to the extent of having a pore volume between about 0.1 and 2.5 cc per gram.

When the granules are utilized as a gas permeable bed in a cigarette filter, they should have a size ranging from about 10—100 mesh (U.S. Sieve Series, ASTME-11-61) and preferably a range of 20-80. In expressing granule size by mesh numbers, it is to be understood that each range signifies that granules will pass through the coarser sieve designated (the smaller sieve number) and will be retained on the finer sieve designated (the larger sieve number). Granules having a size finer than about 100 mesh generally impart too high an impedance to gas flow. Granules larger than about 8 mesh provide reduced efficiency of removal of hydrogen cyanide.

The potassium ferrate (VI) compounds are readily prepared by the method of Thompson et al. (*J. Amer.*

*Chem. Soc.*, 73 (1951), 1379) utilizing the reaction of sodium hypochlorite with ferric nitrate and subsequent conversion to the potassium salt. The purified, dried potassium ferrate is obtained in the form of very fine crystalline needles having an average length less than about one millimeter. The ferrates (VI) may also be prepared from ferrates (IV) by methods disclosed in U.S. Pat. No. 2,835,553. Sodium ferrate ($Na_2FeO_4$) may be prepared by methods disclosed in German Pat. No. 1,013,272, Aug. 8, 1957).

The ferrate-containing granules may be dry-blended with other granular material useful in cigarette filters in a weight ratio of about one part ferrate-containing granules to three parts of other granular materials and preferably at a ratio of about one to one. It has been found that the presence of strongly alkaline compounds in admixture with the ferrates improves storage stability. In the absence of the alkaline compounds, the ferrates will decompose on standing at room temperature. Alkaline compounds suitable as stabilizers for the ferrates include potassium hydroxide, sodium hydroxide, and the like.

In a preferred embodiment of the invention, the ferrate crystals are dissolved in a concentrated aqueous hydroxide solution which is then used to impregnate a granular support, preferably a zeolite molecular sieve. The impregnated granules are then treated with a stream of carbon dioxide gas to convert the alkaline hydroxide to its corresponding carbonate salt. The impregnated material is then dried at temperatures below about 100° C., and preferably at temperatures from about 0° C. to about 50° C. The drying step may be carried out with the aid of a vacuum or a stream of dry inert gas such as nitrogen. The extent of drying is such that the granules will retain from about 2% to about 10% moisture. Overdrying of the ferrate impregnated material may result in loss of storage stability.

The active ferrate filter materials whether dry-blended or impregnated on various supports may be used alone in a filter element or may be blended with other known granular materials having gas phase activity such as activated carbon, permanganate-impregnated alumina, and the like. For this purpose, the activated carbon is a variety generally employed for gas adsorption, having a surface area of at least about 800 $m^2/gm$, and ranging as high as about 1600 $m^2/gm$. The carbon granules are preferably employed in an amount of from about 30 to about 50% by weight of the total mixture. When permanganate is used, it is preferable to employ essentially silica-free activated alumina granules impregnated with an aqueous permanganate solution and a basic sodium compound according to methods disclosed in U.S. Pat. No. 3,957,059 to Rainer et al. Basic sodium compounds which may be used include sodium hydroxide, sodium carbonates, sodium phosphates, and sodium borates. The permanganate-alumina composition when blended with the ferrate filter material enhances the overall efficiency of the combined filter in that it is especially effective in reducing the amount of nitrogen oxides which may be present in tobacco smoke.

The filter material, whether employed per se or in admixture with other materials, can be utilized as a bed in a space between plugs of a standard cellulose acetate filter rod. The filter assembly is then abutted against a cylinder of tobacco, and a paper wrapper may be employed to fasten the filter to the tobacco rod. Alternatively, the filter material may be separate from the smokable tobacco product, such as a filter unit adaptable for use with a cigarette or cigar holder. In a similar fashion, a filtering device employing the material of this invention can be appropriately packed into the stem of a tobacco pipe. In all such filter configurations, the granule-containing filter will have a resistance to draw (RTD) of less than about 5" water when measured at an air flow velocity of 1050 cc/min. Acceptable RTD and hydrogen cyanide removal can be achieved by using from about 50 to 400 mg of the filter material of the invention in the specified mesh size.

For the purposes of this invention, hydrogen cyanide determinations on cigarette smoke were carried out by infrared analysis which provides a value representation of the hydrogen cyanide present in the gas stream. By this method, it has been found that the filter material of this invention is capable of reducing the hydrogen cyanide content of tobacco smoke by about 25 to about 70%.

It will be understood that still other materials generally known in the cigarette filter art may be utilized to either selectively remove other components of the smoke, or flavor compounds may be used in combination with the filter material.

The following examples are illustrative.

EXAMPLE 1

Forty parts of potassium ferrate crystals ($K_2FeO_4$) prepared according to the method of Thompson et al., were dry blended with 60 parts of a microporous polyethylene powder having a 40/80 mesh size. Sixty milligrams of this mixture were placed in a 10 mm long cigarette filter compartment bounded by two 6 mm long plugs of 8 mm diameter cellulose acetate filter rod comprised of 8 denier filaments in a bundle having a total denier of 40,000. The entire filter assembly, having an 8 mm cylindrical diameter, was wrapped with a stiff nonporous paper.

The filter assembly was attached to an end of a Kentucky IRI Reference cigarette described in a research bulletin entitled *The Reference Cigarette* published by the University of Kentucky, Aug. 29, 1964. The overall RTD of the cigarette and filter combination was 5" water when measured at an air flow velocity of 1050 cc/min. Two cigarettes were simultaneously smoked on an electric smoking machine which drew air through the lit cigarette in puffs of 2 secs. duration, 35 cc of air/puff, and permitting 58 seconds of static burn between puffs. The smoke from 8 puffs was passed through a Cambridge filter pad to remove total particulate matter. The resultant gas phase of the smoke was combined through a common manifold and collected in a previously evacuated one meter infrared gas cell. The gas in the cell was then subjected to infrared spectroanalysis, using a Perkin-Elmer 221 infrared spectrophotometer with ordinate scale expansion. Three replicate samples were taken. The identical procedure was used with control cigarettes which were identical to the cigarettes combined with the filter material except that the 10 mm compartment was filled with untreated microporous polyethylene. Comparison of the absorption band height from the cigarette combined with the filter material and the control cigarettes indicated that a 28% reduction in HCN was achieved by the filter material of the invention. No other measured components of the smoke were affected. The taste of the cigarette was essentially unchanged from that of a control cigarette. By way of comparison, the untreated microporous polyethylene filter provided cigarette smoke showing no reduction in HCN content.

EXAMPLE 2

Potassium ferrate, prepared by the aforesaid procedure, is dissolved to saturation in an aqueous 10 molar solution of potassium hydroxide. The resultant solution was utilized to impregnate to saturation 20/40 mesh granules of molecular sieve material (type SK-40, sold by the Ventron Company of Beverly, MA). The impregnated granules were treated with a stream of $CO_2$ gas to convert the potassium hydroxide to potassium carbonate, and the resultant product was dried. 250 mg. of this material was loaded into filters of the same construction utilized in Example 1, and the filters were mounted onto tobacco rods. The overall cigarette and filter RTD was 5" $H_2O$.

Testing of the smoke delivered through the filters was carried out in the same manner described in Example 1. It was found that a 66% reduction in HCN content of the gas phase of the smoke was produced. Little measurable effect was produced on other smoke components, as judged by IR analysis of gas phase. There was no evidence (such as discoloration) to show potassium ferrate emerging into the smoke stream, and the cigarette smoke had acceptable flavor. A control filter, prepared from the granular molecular sieve material without additon of the potassium ferrate solution, produced a 12% reduction in HCN content of the smoke.

EXAMPLE 3

Potassium ferrate-impregnated molecular sieve granules, as prepared by the method of Example 2, were blended with an equal weight of 20/40 mesh size granules of alumina impregnated with sodium permanganate/sodium hydroxide in accordance with U.S. Pat. No. 3,957,059 to Rainer et al.

250 mg of the blended granular mixture was loaded into filters of the same construction utilized in Example 1, and the filter assembly was attached to an end of Kentucky IRI Reference cigarettes. The overall RTD of the cigarette and filter combination was 5" water when measured at an air flow velocity of 1,050 cc/minute. The cigarettes were smoked and the resultant smoke was analyzed by the methods of Example 1.

It was found that the smoke produced by the cigarettes of this example delivered 85% less HCN and 65% less oxides of nitrogen than the same cigarettes having only a conventional cellulose acetate filter plug.

When the filter assembly was made to contain solely the alumina granules impregnated with sodium permanganate/sodium hydroxide, the reduction in amount of HCN in the delivered smoke was only 60%, and the reduction in delivered oxides of nitrogen was only 48%.

What is claimed is:

1. An article comprising a smoking material and in smoke filtering relationship therewith a filter element containing an inert gas-permeable granular support material impregnated with alkali or alkaline earth, ferrate, said ferrate being present in an amount from about 15 to about 50% by weight of said impregnated material.

2. The article of claim 1 in which said granular support material has admixed therewith from about 30 to about 50% by weight of activated charcoal.

3. The article of claim 1 in which said granular support comprises a zeolite molecular sieve.

4. The article of claim 1 in which said ferrate is potassium ferrate VI in admixture with potassium hydroxide.

5. The article of claim 1 in which said granular support material has admixed therewith about 25 to about 50% by weight of granules of essentially silica-free alumina impregnated with a solution of sodium permanganate in combination with a basic sodium compound.

6. An inert gas-permeable granular support material impregnated with alkali or alkaline earth ferrate, said ferrate being present in an amount from about 15 to about 50% by weight of said impregnated material, in admixture with from about 30 to about 50% by weight of activated carbon having a surface area of from about 800 $m^2/gm$ to about 1600 $m^2/gm$.

7. An inert gas-permeable granular support material impregnated with alkali or alkaline earth ferrate, said ferrate being present in an amount from about 15 to about 50% by weight of said impregnated material, in admixture with from about 25 to about 50% by weight of granules of essentially silica-free alumina impregnated with a solution of sodium permanganate in combination with a basic sodium compound.

8. A filter element for tobacco smoke containing an inert gas-permeable granular support material impregnated with alkali or alkaline earth ferrate, said ferrate being present in an amount from about 15 to about 50% by weight of said impregnated material, in admixture with from about 30 to about 50% by weight of activated carbon having a surface area from about 800 $m^2/gm$ to about 1600 $m^2/gm$.

9. A filter element for tobacco smoke containing an inert gas-permeable granular support material impregnated with an alkali or alkaline earth ferrate, said ferrate being present in an amount from about 15 to about 50% by weight of said impregnated material, in admixture with from about 25 to about 50% by weight of granules of essentially silica-free alumina impregnated with a solution of sodium permanganate in combination with a basic sodium compound.

* * * * *